US 11,653,585 B2

(12) United States Patent
Maro

(10) Patent No.: US 11,653,585 B2
(45) Date of Patent: May 23, 2023

(54) IMPLEMENT VARIABLE DOWNFORCE CONTROL

(71) Applicant: Deere & Company, Moline, IL (US)

(72) Inventor: Randall A. Maro, Davenport, IA (US)

(73) Assignee: Deere & Company, Moline, IL (US)

( * ) Notice: Subject to any disclaimer, the term of this patent is extended or adjusted under 35 U.S.C. 154(b) by 445 days.

(21) Appl. No.: 16/893,819

(22) Filed: Jun. 5, 2020

(65) Prior Publication Data

US 2021/0378160 A1    Dec. 9, 2021

(51) Int. Cl.

| A01B 63/10 | (2006.01) |
|---|---|
| A01B 63/00 | (2006.01) |
| A01B 63/111 | (2006.01) |
| A01B 71/02 | (2006.01) |
| A01C 7/20 | (2006.01) |

(52) U.S. Cl.
CPC ........ *A01B 63/1006* (2013.01); *A01B 63/008* (2013.01); *A01B 63/1115* (2013.01); *A01B 71/02* (2013.01); *A01C 7/203* (2013.01)

(58) Field of Classification Search
CPC .............. A01B 63/1006; A01B 63/008; A01B 63/1115; A01B 71/02; A01B 63/10; A01B 63/02; A01B 63/00; A01B 63/002; A01B 63/111; A01B 71/00; A01C 7/203; A01C 7/201; A01C 7/20; A01C 7/00
See application file for complete search history.

(56) References Cited

U.S. PATENT DOCUMENTS

| 7,481,278 | B1 | 1/2009 | Pomedli et al. |
|---|---|---|---|
| 8,544,397 | B2 | 10/2013 | Bassett |
| 8,634,992 | B2 | 1/2014 | Sauder et al. |
| 8,807,057 | B2 | 8/2014 | D'Amico et al. |
| 2013/0032363 | A1 | 2/2013 | Curry et al. |
| 2013/0112121 | A1 | 5/2013 | Achen et al. |
| 2013/0228107 | A1 | 9/2013 | Martin |
| 2019/0029165 | A1 | 1/2019 | Leimkuehler et al. |

OTHER PUBLICATIONS

Extended European Search Report and Written Opinion issued in European Patent Application No. 21172587.4, dated Oct. 15, 2021, in 06 pages.

*Primary Examiner* — Christopher J. Novosad
(74) *Attorney, Agent, or Firm* — Tucker Ellis LLP; Michael G. Craig

(57) ABSTRACT

One or more techniques and/or systems for application of a supplemental downward force to a ground working implement. A mechanical advantage from a lever arm can be utilized to apply supplemental downforce to a ground working implement. A biasing force can be applied to the lever arm by a spring assembly at various locations. Moving the spring assembly along the lever arm can vary the amount of downward force applied by the lever arm to ground working implement. In some implementations, moving the spring assembly to a different end of the lever arm applies an upward force to a coupled ground working implement.

20 Claims, 8 Drawing Sheets

IMPLEMENT VARIABLE DOWNFORCE CONTROL

BACKGROUND

Ground working implements are often used in fields work the soil, such as for ground conditioning and planting. The tools attached to the implements engage the ground, such as to turn, open, and/or close the soil. Soil conditions can alter the ability for ground working tools to dig into the ground, particularly when the soil is compacted, dense, or otherwise difficult to engage. Therefore, along with the design of the tools, a supplemental downward force can be applied to the implements to assist to tools in reaching a desired depth in the ground. For example, seeders are used to plant crops, where a furrow opener is used to open a furrow, a seed is planted, and the furrow is subsequently closed. In this example, the seeds are planted at a target depth that improves germination and growth. Therefore, a downward force can be applied to the implement to achieve the target depth.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for application of a supplemental downward force to a ground working implement. In one implementation, a mechanical advantage can be utilized to apply supplemental downforce to a ground working instrument, such as to allow the implement to dig into the ground. A biasing force applied to a target location on a lever arm can apply supplemental downforce to the movable frame of the implement. Moving the biasing force to a different location on the lever arm can apply a different amount of downward force on the implement. Further, applying the biasing force to another portion of the lever arm may apply an upward force on the implement.

In one implementation of a system for application of a variable downward force for a ground-working implement, a movable frame can be operably engaged with a stationary frame by a linkage. The movable frame can support a ground-working implement to engage the ground. Further, a downforce application device frame can be operably, fixed engaged with the stationary frame. Additionally, a lever arm can be pivotably engaged with a bottom portion of the device frame, and a spring assembly can be pivotably engaged with the device frame at a first end and movable along the lever arm at a second end. In this implementation, the spring assembly can apply a downward biasing force to the lever arm. A coupling arm can be engaged with the lever arm at a first end of the coupling arm, and can be engaged with the linkage at a second end of the coupling arm. When the spring assembly is disposed at a first end of the lever arm it applies a downward force to the linkage; and when the spring assembly is disposed at a second end of the lever arm it applies an upward force to the linkage.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1:
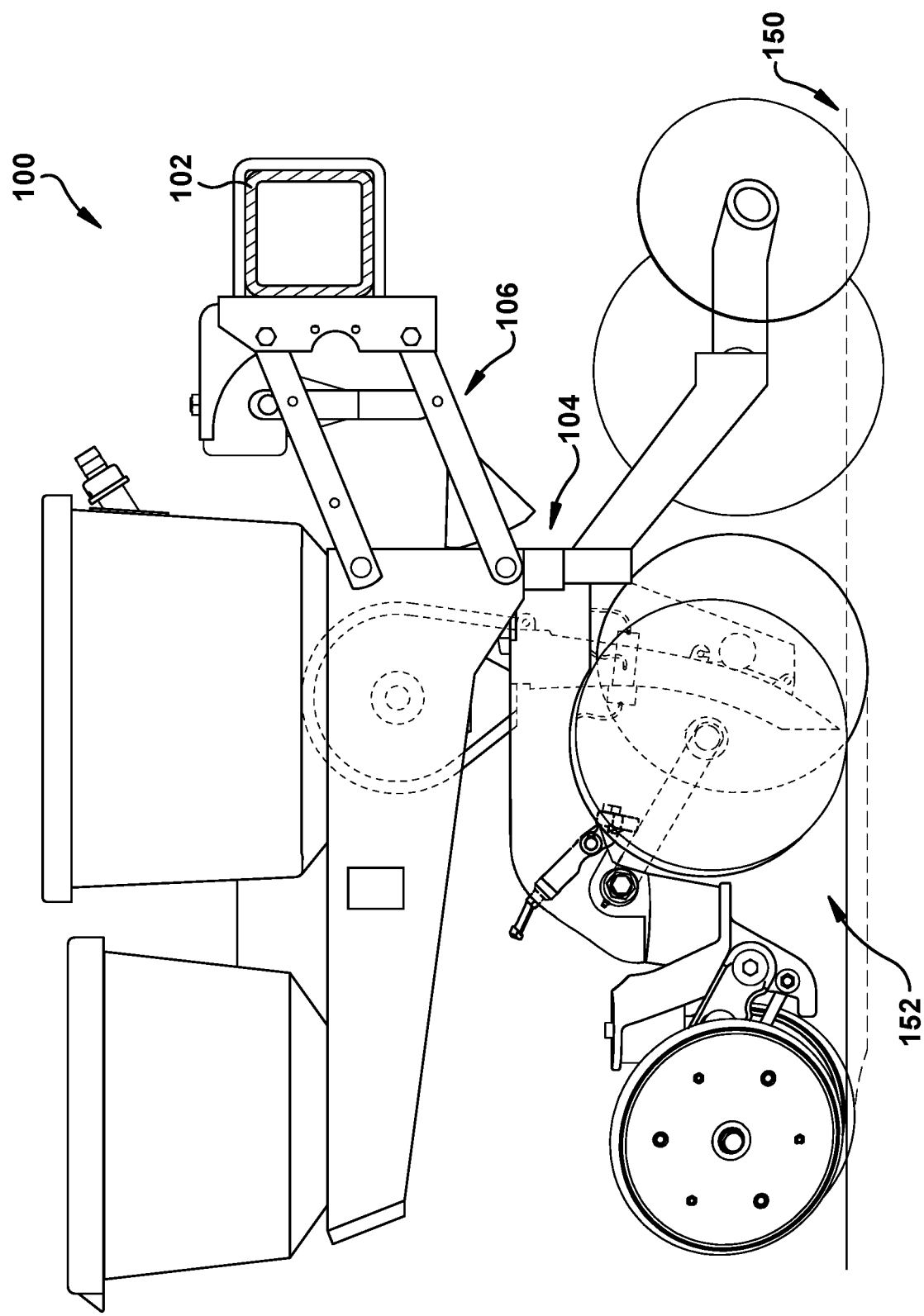
FIG. 1 is a component diagram illustrating one implementation of a portion of a ground working implement.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Figure 2:
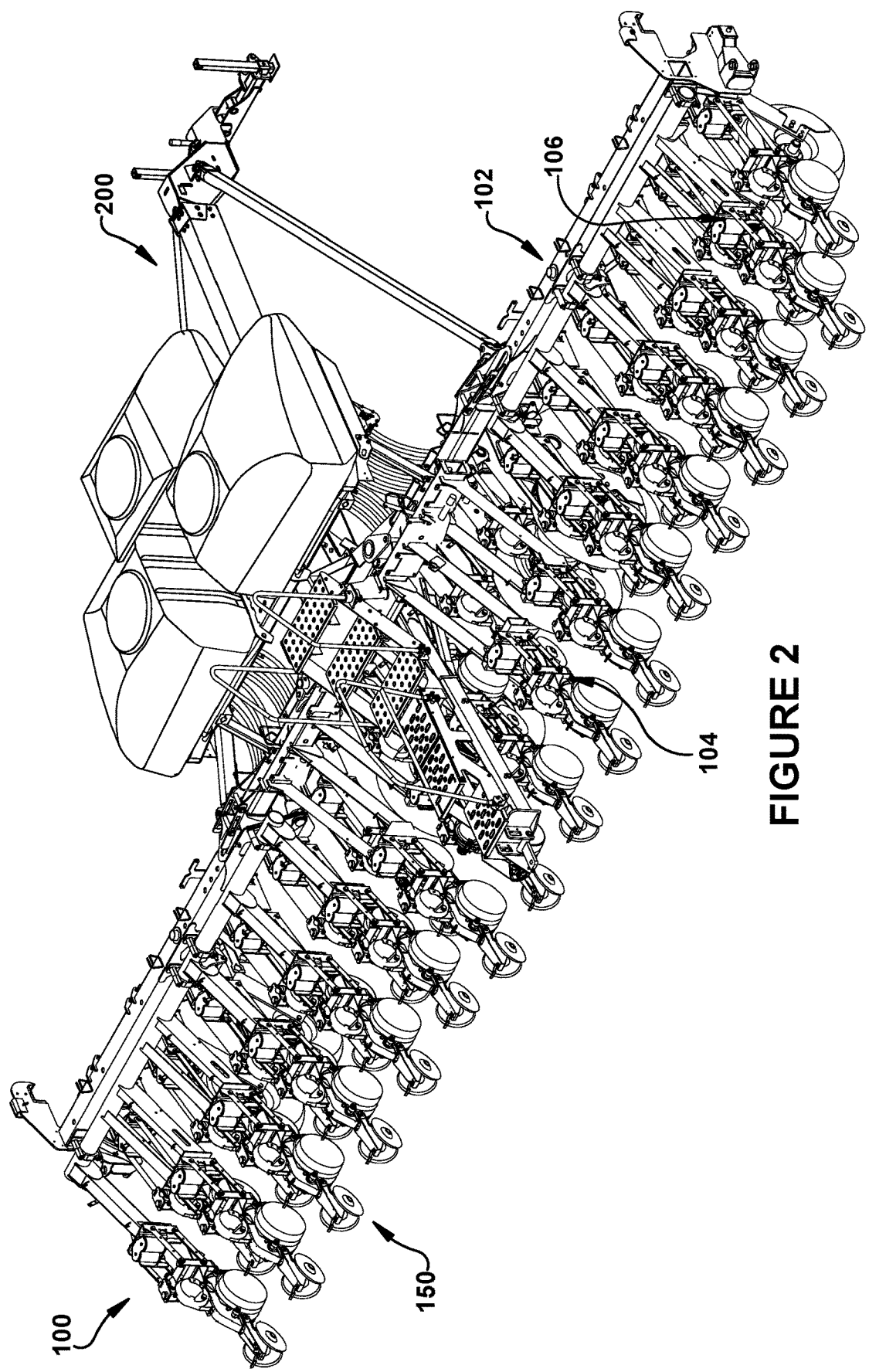
FIG. 2 is a component diagram illustrating one implementation of a ground working implement.

FIGS. 1 and 2 are component diagrams illustrating an example implementation of one or more portions of a ground working implement. In this implementation, as illustrated in FIG. 1, the example portion 100 of the ground working implement 200 comprises a single row seeder unit of a seeding implement; however, the ground working implement could comprise other ground working implements. For example, the seeder implement 200 can comprise a stationary frame 102 that is configured to remain substantially stationary (e.g., from up and down and/or side to side movement) during operation. As an example, the seeder implement 200 can be towed behind a vehicle, such as a tractor, during a seeding operation in a field.

As illustrated in FIG. 2, the single row seeder unit 100 can be operably (e.g., during operation) engaged with the stationary frame 102 of the seeder implement 200. Further, the seeder unit 100 can comprise a moveable frame 104, which is configured to move (e.g., up and down) during operation. That is, for example, a ground working implement, such as the seeder unit 100, can be configured to utilize ground working tools 152 to dig into the ground 150, such as to create a trench to place a seed, and cover the trench with earth. In this example, the moveable frame can be configured to move downward to drive the tools 152 into the ground to a desired depth, and to move upward to account for differing ground terrain and levels.

Further, as illustrated, the stationary frame 102 can be operably coupled to the movable frame 104 by a linkage 106. In some implementations, the linkage 106 can comprise a four-bar linkage that can be used to keep the movable frame 104 substantially parallel to the stationary frame 102 as it moves up and down. The examples illustrated in FIGS. 1 and 2 are implementations 100, 200 where one or more portions of the systems and devices described herein may be implemented. That is, for example, a downward force application device or system can be devised to apply a downward force to the unit of the implement, such that the ground working tools may impact into the soil at a desired depth. As an example, soil density or hardness may impact the ground working tool's ability to trench to the desired depth. In this example, a downward force application device may apply downward force to the tools to drive them to the desired depth.

Figure 3A:
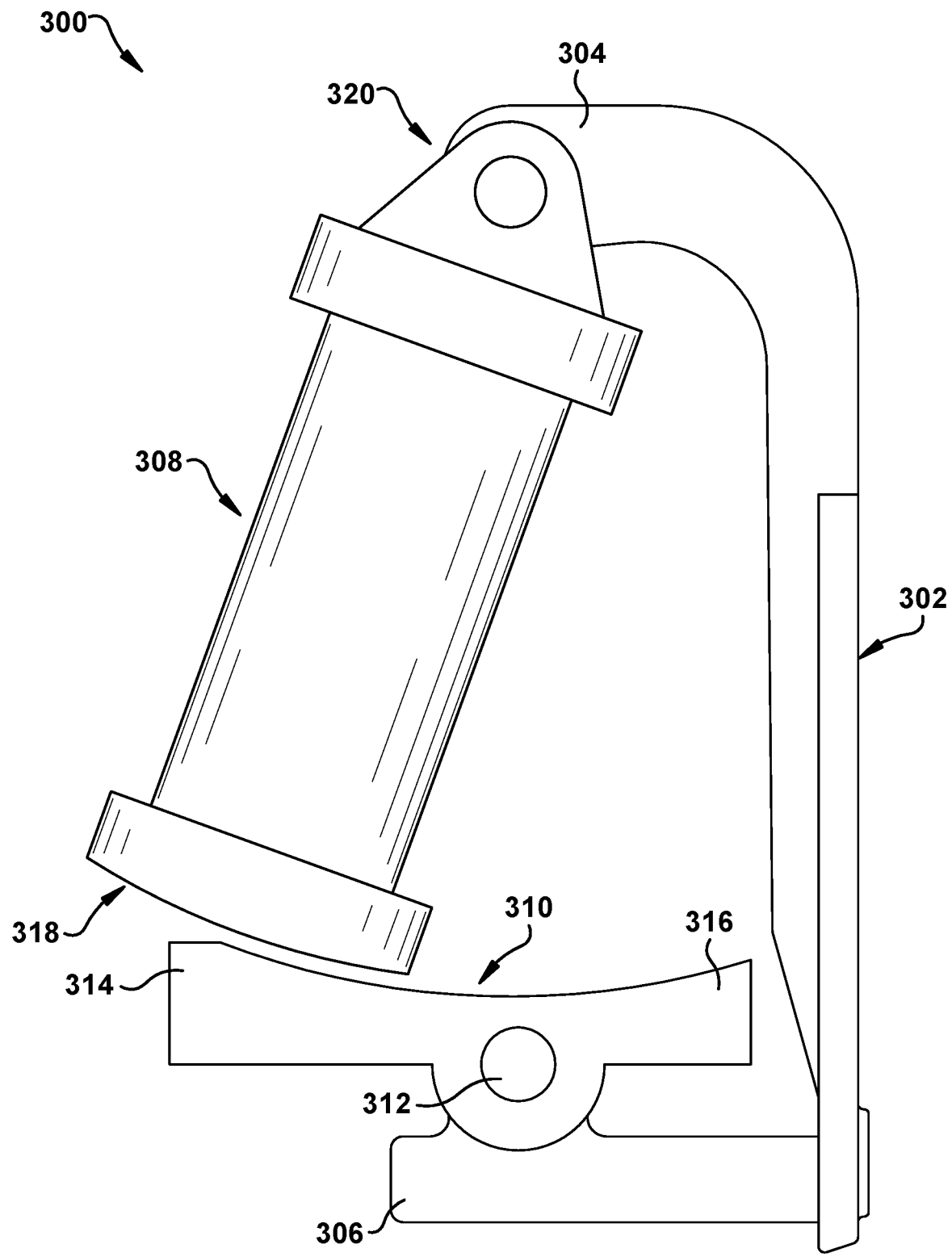
FIGS. 3A, 3B, 3C are component diagrams illustrating various views of one implementation of one or more portions of a supplemental downward force application system.
Figure 3B:
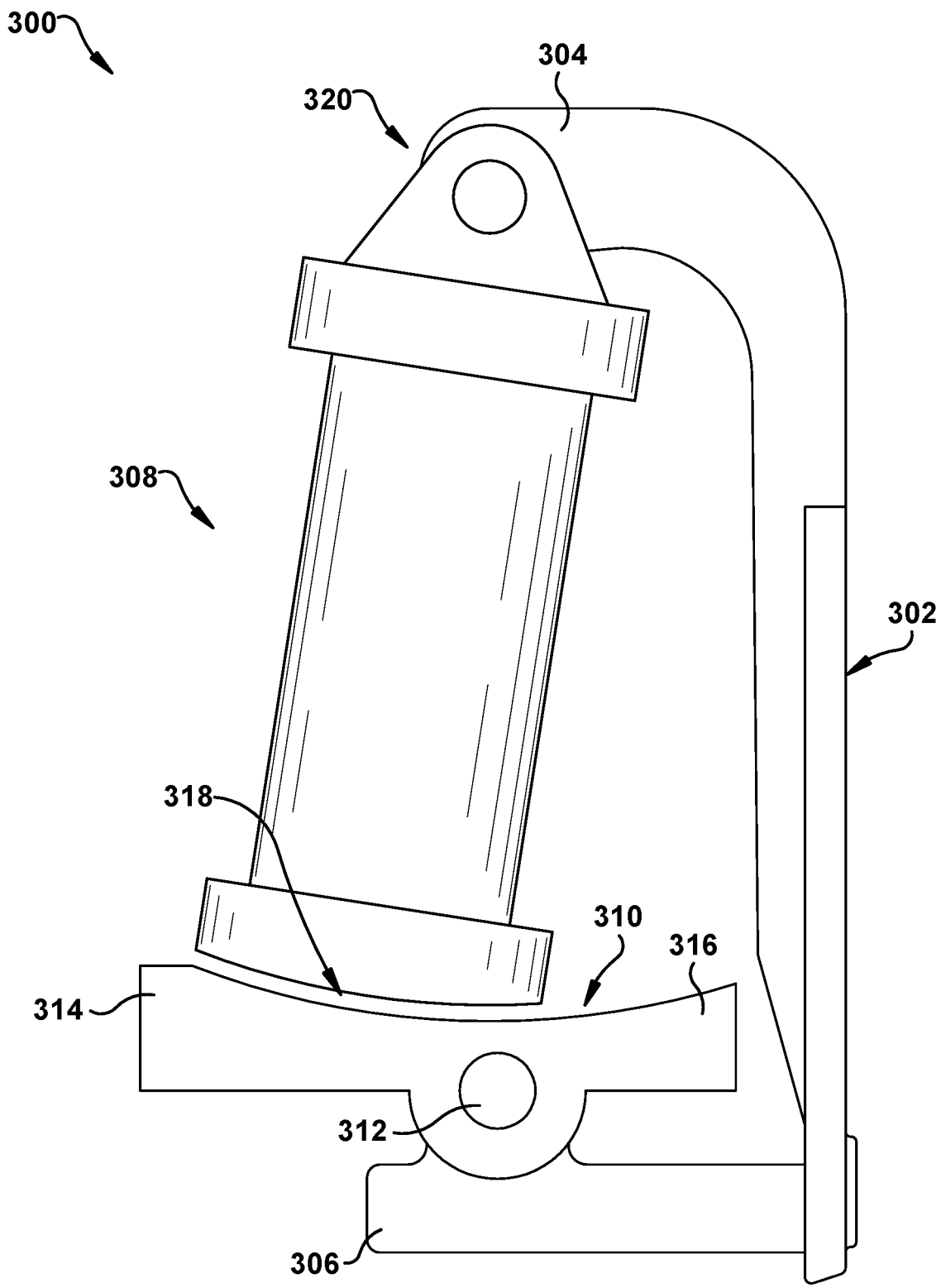
Figure 3C:
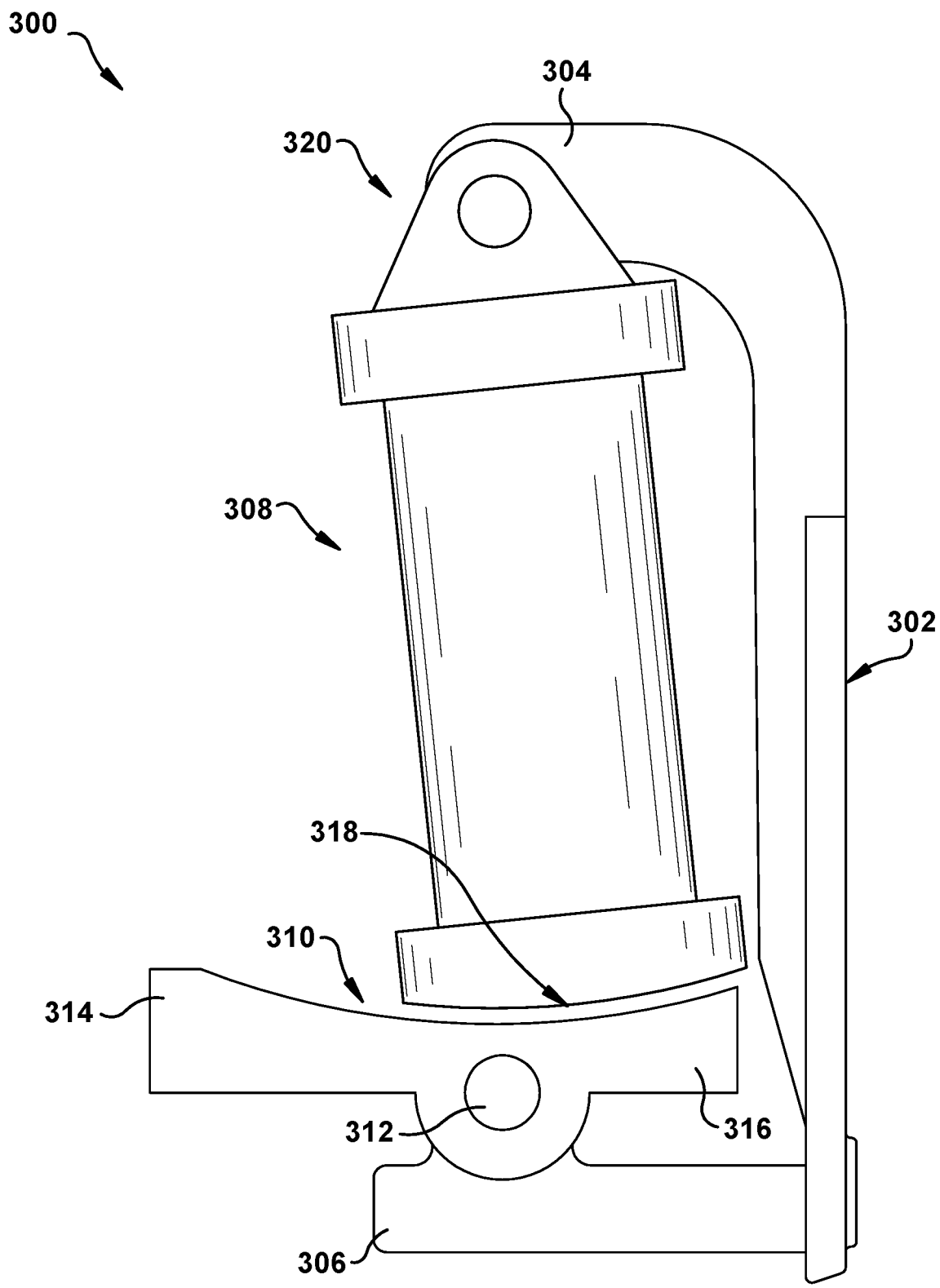

FIGS. 3A, 3B, and 3C are component diagrams illustrating various views of one implementation of an example device 300 for providing application of supplemental downforce (e.g., and upforce) to a ground working implement component. In this implementation, the example device 300 comprises a device frame 302 that is configured to fixedly engage with a stationary frame (e.g., 102 of FIGS. 1 and 2) of a ground working implement. The device frame 302 can comprise a tope member 304 and a bottom member 306. As an example, the top member 304 can comprise an arm or projection that projects out from a top portion of the frame 302, and the bottom member 306 can comprise an arm or projection that projects out from a bottom portion of the frame 302.

In this implementation, the example device 300 can comprises a lever arm 310 that is pivotably engaged with the bottom member 306. The lever arm 310 comprises a pivot point 312, which is the location of the pivotably engagement with bottom member 306. The lever arm 310 further comprises a first end 314 and a second end 316, and the pivot point 312 is disposed between the first end 314 and the second end 316. A spring assembly 308 comprises a top 320 and bottom 318. The top 320 can be pivotably engaged with the top member 304 of the device frame 302; and the bottom 318 can be movable along the lever arm 310 between the first end 314 and the second end 316. Additionally, the spring assembly 308 can be configured to apply a downward biasing force on the lever arm 310.

In one implementation, the lever arm 310 can comprise a concave shape, as illustrated in FIGS. 3A-3C. In this implementation, for example, the concave shape can be configured to accommodate the arc-like movement of the bottom 318 of the spring assembly 308 as it translates along the lever arm 310. That is, for example, the pivotable engagement of the top 320 of the spring assembly 308 with the top member 304 of the device frame 302, provides for the bottom 318 of the spring assembly 308 translating along the lever arm 310 in an arc. In this example, the concave shape of the lever arm can complement the arc movement of the spring assembly 308.

Further, as illustrated in FIGS. 3A, 3B, and 3C, in one implementation, when the bottom 318 of the spring assembly 308 is disposed at the first end 324 (e.g., as illustrated in FIG. 3A), the spring assembly 308 can apply a higher downward force to the lever arm 310 than when the bottom 318 of the spring assembly 308 is disposed between the pivot point 312 and the first end 314 (e.g., as illustrated in FIG. 3B). That is, for example, the amount of downward force applied to the lever arm 310 increases as the bottom 318 of the spring assembly 308 is translated from the pivot point 312 to the first end 314 of the lever arm 310.

In one implementation, the amount of downward biasing force applied by spring assembly 308 can be substantially constant (e.g., substantially the same amount of biasing force applied regardless of a location of the bottom 318 of the spring assembly 308 on the lever arm 310). In this implementation, for example, the substantially constant amount of downward biasing force applied to the lever arm can be used to determine a function (e.g., formula or curve) that yields a relationship between the position of the spring assembly 308 on the lever arm 310, and the amount of downward force applied by the first end 314 of the lever arm 310 resulting from the downward biasing force of the spring assembly 308. In this way, for example, the position of the spring assembly 308 can be adjusted to yield a desired amount of downward force applied by the lever arm 310. As an example, the spring assembly can comprise a mechanical spring (e.g., applying a substantially constant biasing force), a pneumatic spring (e.g., an air spring that is set to apply a substantially constant biasing force), or a hydraulic spring or accumulator (e.g., set to apply a substantially constant biasing force).

In another implementation, the spring assembly 308 can provide a selectably variable downward biasing force. That is, for example, the spring assembly 308 can comprise an adjustable force applicator, such as a mechanical spring where the compression can be adjusted, thereby adjusting the biasing force applied; an adjustable pneumatic spring; or an adjustable hydraulic spring, such as a hydraulic piston or ram. In this implementation, the adjustment of the downward biasing force applied by the spring assembly 308 to the lever arm 310 may allow for finer granularity in application of downward force by the lever arm 310. Further, the additional downward (e.g., or upward) biasing force applied by the spring assembly 308 may allow for a multiplying effect of the force applied by the lever arm 310, thereby providing additional downward (e.g., or upward) force applied to the movable frame (e.g., 104), for example. Additionally, for example, the amount of additional downward force applied by the selectably adjustable spring assembly can be known. In this example, the amount of downward force applied by the lever arm (e.g., the first end 314 of the lever arm 310) based on the location of the spring assembly 308 may also be known. Therefore, an amount of force applied by the lever arm 310 can be determined based on the location of the spring assembly 308 and the amount of biasing force applied by the adjustable spring assembly 308.

As illustrated in FIG. 3C, the spring assembly 308 can be disposed at the second end 316 of the lever arm 310 (e.g., or between the pivot point 312 and the second end 316) to apply an upward force to the first end 314 of the lever arm 310. This action can be based on the lever action of the lever arm's relationship with the pivot point 312, and the location of the pivot point 312 between the first end 314 and the second end 316. That is, for example, the spring assembly 308 applies a downward biasing force to the second end 316 of the lever arm 310, which results in an upward force action at the first end 314 of the lever arm 310. In one implementation, the pivot point 312 of the lever arm can be disposed closer to the second end 316 than the first end 314. In this implementation, the location of the pivot point 312 on the lever arm 310 can determine that amount of upward force applied at the first end 314 of the lever arm 310, based on well-known lever machine principles.

Figure 5:
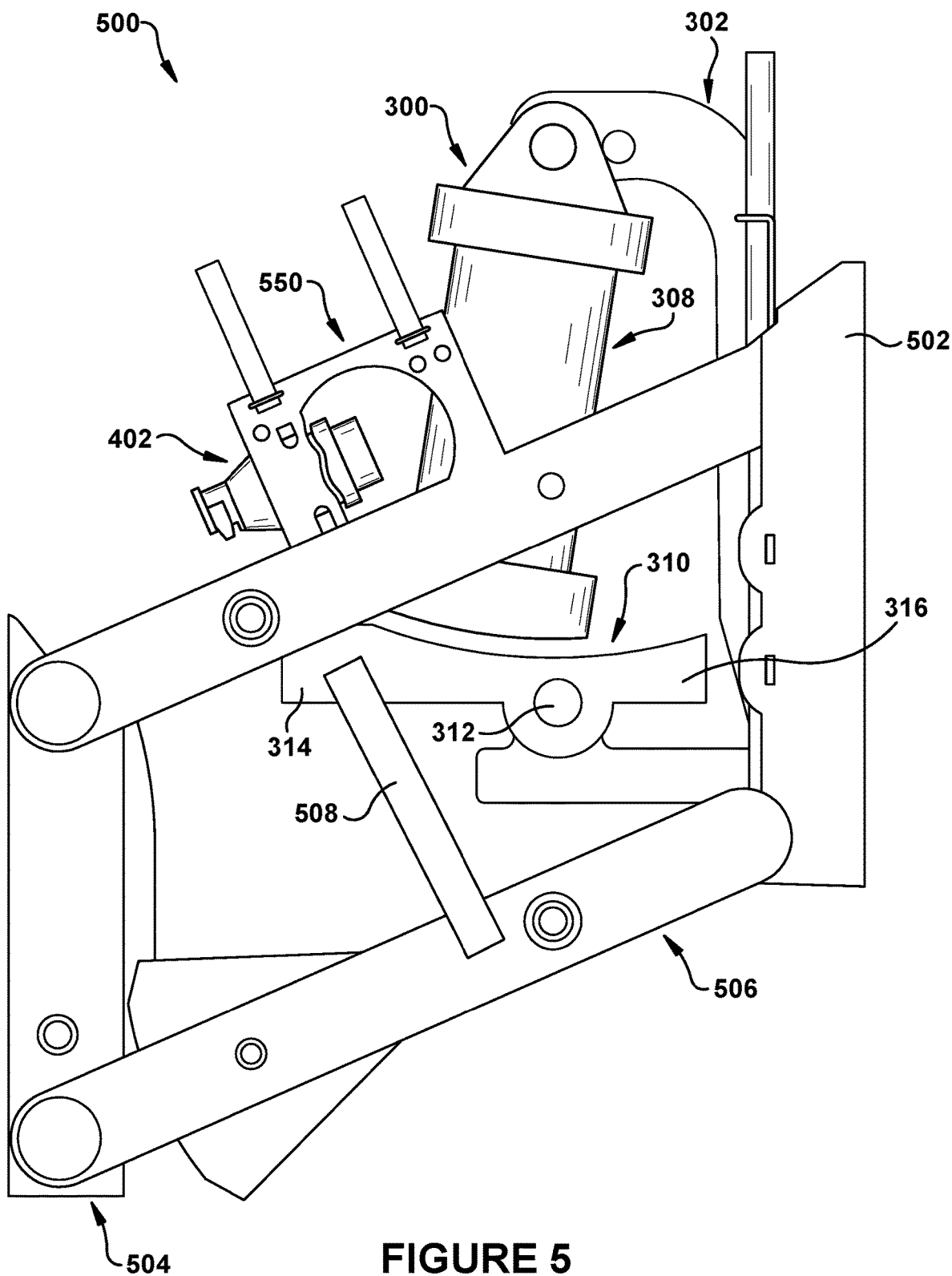
FIG. 5 is a component diagram illustrating one implementation of one or more portions of one or more systems described herein.

As illustrated in FIG. 5, which is a component illustrating one example implementation 500 of how the exemplary device 300 may be utilized, a system for application of a downward force to a ground-working implement can comprise a coupling arm 508, which is operably engaged (e.g., pivotably) with the lever arm 310 at a first end 510 of the coupling arm 508. Further, the coupling arm 508 is operably engaged (e.g., pivotably) with the linkage 506 at a second end 512 of the coupling arm 508. In one implementation, the first end 510 of the coupling arm 508 can be coupled with the first end 314 of the lever arm 310. In this implementation, for example, disposing the engagement between the coupling arm 508 and the lever arm 310 at the first end 314 may allow for application of a higher amount of downward and/or upward force by the lever arm 310.

In this implementation, disposing the spring assembly 308 at the first end 314 of the lever arm 310 applies a downward force to the linkage 506, and disposing the spring assembly 308 at the second end 316 of the lever arm 310 applies an upward force to the linkage 506. As an illustrative example, disposing spring assembly 308 at the first end 314 of the lever arm 310 (e.g., as illustrated in FIG. 3A) applies a downward biasing force to the lever arm 310. In this example, in turn, the lever arm 310 applies a downward force to the coupling arm 508, which applies that force to the linkage 506. The linkage 506 is coupled between the stationary frame 502 and the movable frame 504 and, application of the downward force to the linkage 506 results in a downward force being applied to the movable frame 504 (e.g., as the stationary frame 502 is substantially unmovable relative to the movable frame 504). In this way, for example, a downward force can be applied to a coupled ground-working tools (e.g., 152 of FIG. 1) by disposing the spring assembly 308 at the first end 314 of the lever arm 310. Further, for example, in a similar way, disposing the spring assembly 308 at the second end 316 of the lever arm 310 can apply an upward force to the ground-working tools.

Figure 4:
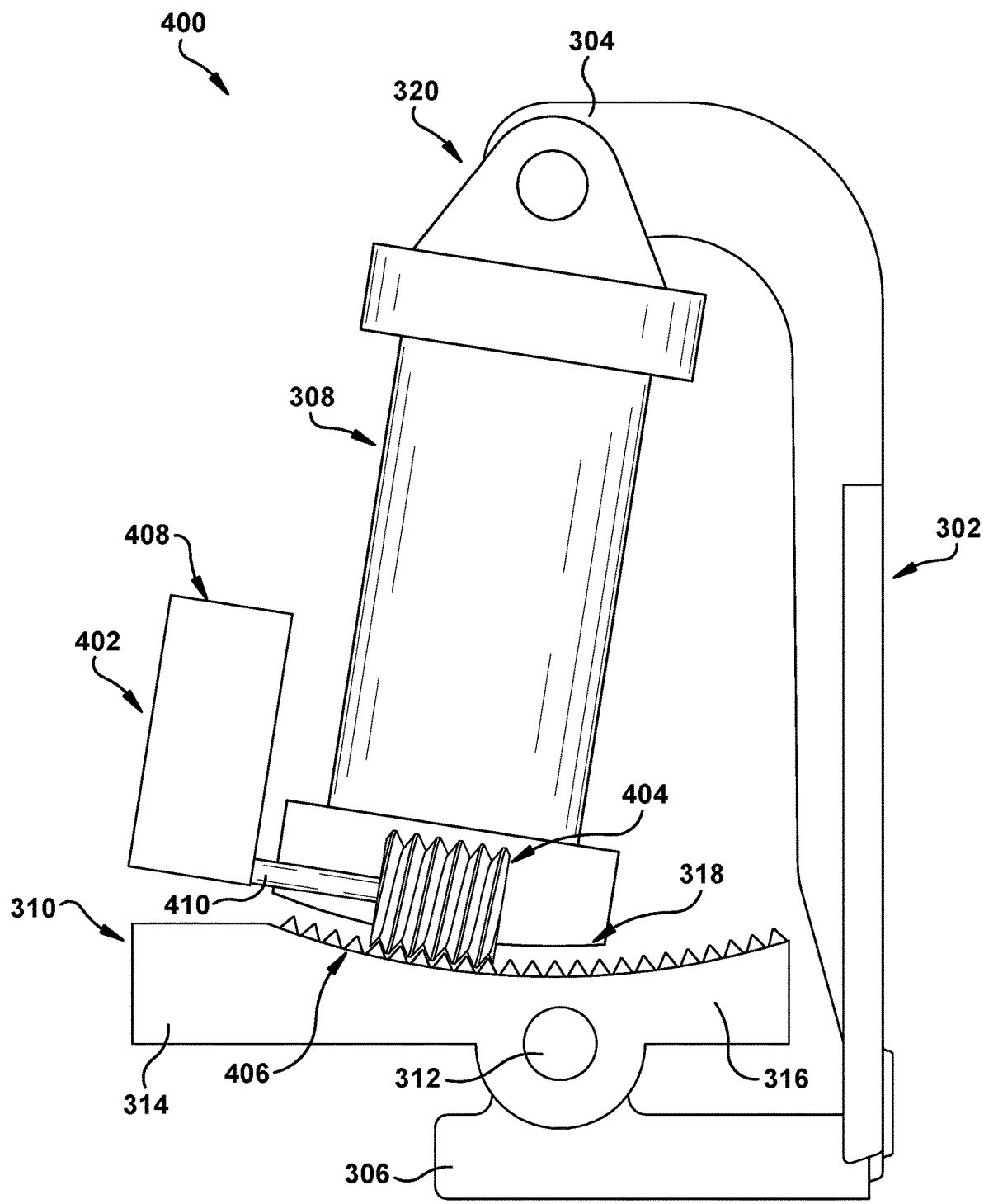
FIG. 4 is a component diagram illustrating one implementation of one or more portions of one or more systems described herein.

FIG. 4 is a component diagram illustrating one implementation 400 of an example device for downforce application. In one implementation, the system or device 300 can comprise an actuator 402 that is coupled with the spring assembly 308 to translate the bottom 318 of the spring assembly 308 along the lever arm 310. In this implementation 400, the actuator can comprise a drive gear 404 driven by a motor 408 that engages a driven gear 406 disposed on the lever arm 310 to move the spring assembly 308 along the lever arm 310. For example, an actuator system or device 402 can comprise a linear actuator, such as one with the motor 408 engaging with a drive shaft 410, which engaged with the drive gear 404. As an example, the drive gear 404 can comprise a balls screw, where the driven gear 406 provides a raceway for ball bearings in the drive gear 404.

As another example, the drive gear 404 can comprise a gear that engages the teeth of the driven gear 406. As another example, the actuator 402 can comprise a hydraulic actuator, magnetic actuator, pneumatic actuator, electric actuator, or other linear actuator to provide for the movement of the spring assembly 308 along the lever arm 310. In some implementations, the actuator 402 may be configured for the adjustment of the position of the spring assembly to be performed manually, such as when the motor or a control is disabled. For example, this may allow the user to operate at a reduced level of performance, but still allow for a desired amount of downward force to be applied to the ground-working implement. Further, utilizing an electric motor or actuator may allow for precise and fast-acting adjustment of the downward force applied. That is, of example, the actuator 402 may be able to move the spring assembly quickly, and/or precisely in response to an adjustment input to the actuator system/device 402.

Figure 6:
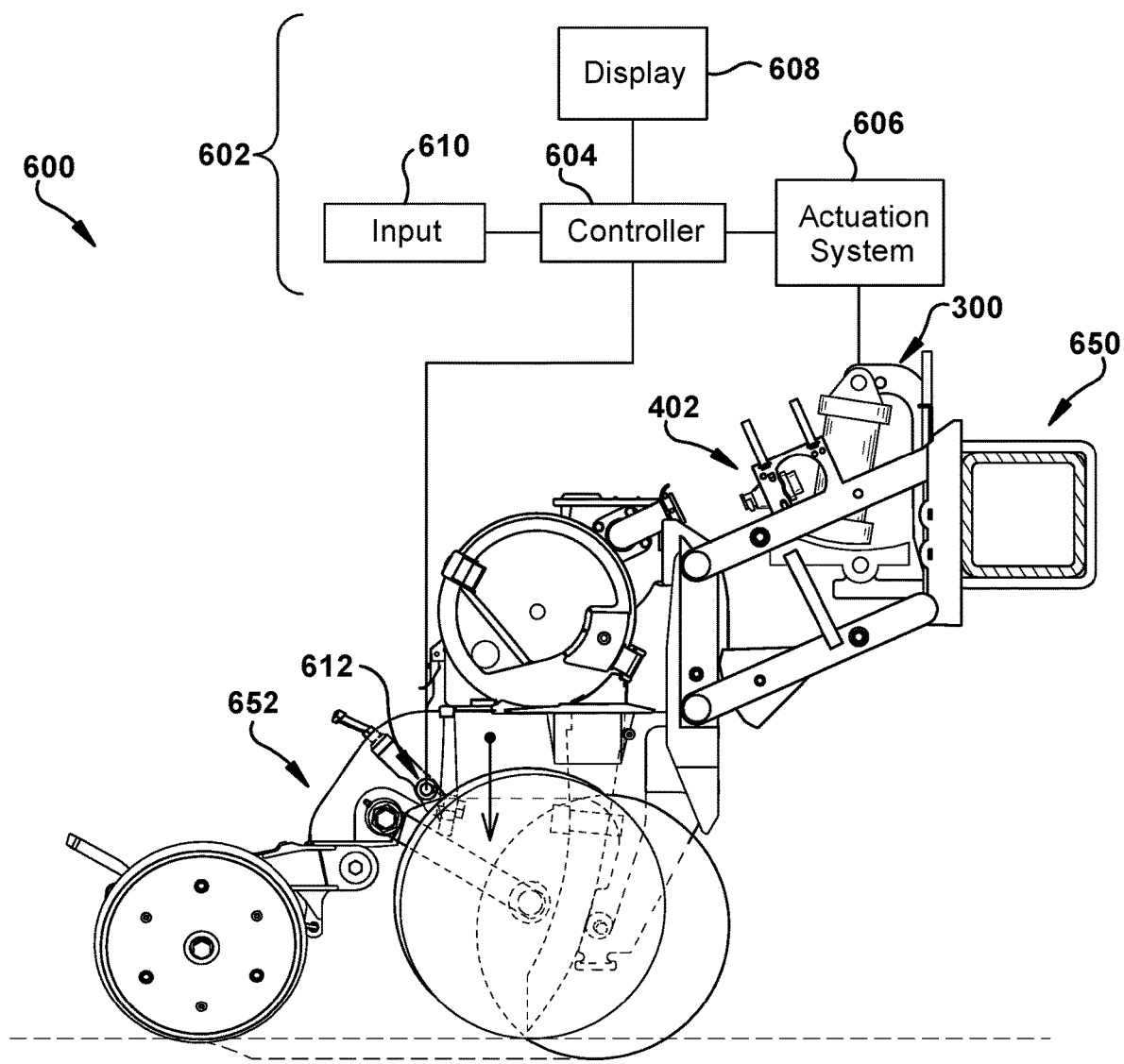
FIG. 6 is a component diagram illustrating one implementation of one or more portions of one or more systems described herein.

In one implementation, as illustrated in FIG. 6, with continued reference to FIGS. 3, 4, and 5, an example system 600 can comprise a controller 604 that is communicatively coupled with the actuator 402. In this implementation, the controller 604 can control the actuator 402 to position the spring assembly 308 along the lever arm 310. As illustrated, the controller 604 can be communicatively coupled with an actuation system 606, which may comprise one or more portions of the actuator 402, such as a switch, drive, microprocessor, or other components used to control and/or active the actuator 402.

Further, in some implementations, the example system 600 can comprise an implement load sensor 612 that is communicatively coupled with the controller 604 to provide data to the controller 604, where the data is indicative of a load applied by the ground 650 on the implement 652. Additionally, the controller 604 can use the actuator 402 (e.g., using the actuation system 606) to control the position of the spring assembly 308 along the lever arm 310 based at least upon the data indicative of the load applied by the ground 650 on the implement 652. That is, for example, the load sensor 612 can be disposed between one or more portions of the ground working implements 652 and the movable frame 656 to detect an amount of load (e.g., in force) results from the ground-working implements 652 contact with (e.g., and digging into) the ground 650. In this example, the movable frame 656 is coupled to the stationary frame 654 by the linkage 658, and the load sensor 612 will provide data indicative of the force resulting from the ground working implements 652, attached to the movable frame 656, interacting with the ground 650 (e.g., the amount of force the ground 650 applies to the movable frame 656 through the ground-working implements 652).

In this implementation, the controller 604, such as using a processor, can identify an amount of downward force to apply to the ground-working tools 652 in order to reach a desired soil depth, based on the amount of force detected by the load sensor 612. That is, for example, the desire depth may be pre-determined and stored in local memory coupled with the controller. The controller can identify the depth of the ground working tools 652 based on the load data provided by the load sensor 656, and set the amount of downforce to apply to the ground-working tools 656 using the actuator 402, spring assembly 308, lever arm 310, coupling arm 508, linkage 658, and movable frame 656. In this example, when the ground conditions change (e.g., due to soil density, hardness, etc.) the load sensor data can provide an indication to the controller to adjust the downward force applied to the ground working tools 656, by sending a signal to the actuator 402 (e.g., using the actuation system 606) to translate the bottom 318 of the spring assembly 308 along the lever arm 310 to a desired location appropriate for the amount of downward force to be applied.

In one implementation, the controller 604 can be communicatively coupled with a user interface 602, for example, comprising a user input 610 and a user display 608. The user interface 602 can display information to a user that results from the data indicative of a load applied by the ground 650 on the implement, for example, detected by the load sensor 612. That is, for example, the user interface 602 can display (e.g., on the display 608) useful information to the user (e.g., inside the vehicle towing the implement) that helps the user identify status of the implement, such as depth of the tools 652, soil condition, load sensor data, etc. Further, the user interface 602 may allow the user to input instruction (e.g., using the user input 610) regarding adjustment of the amount of downward force (e.g., or upward force) applied to the implement.

In this implementation, the controller 604 can automatically adjust the position of the spring assembly 308 along the lever arm 310, using the actuator 402, based at least upon the data indicative of the load applied by the ground on the implement and a preset threshold load level. That is, for example, the controller receives the load sensor data from the load sensor 612 and compares it to a preset load level threshold (e.g., based on expected soil conditions), then automatically output a signal to the actuation system 606 to adjust the actuator 402 to apply an appropriate amount of downward force applied by the lever arm 310. Further, the controller can be used to adjust the position of the spring assembly 308 along the lever arm 310, using the actuator 402, based at least upon input received from the user interface 602. That is, the user may input instructions to adjust the amount of downward force applied to the ground implements 652 using the user input 610.

As an illustrative example, the ground-working implement (e.g., 200 of FIG. 2) can be coupled to a vehicle, such as a tractor, to be towed around a field. In this example, a preset in-ground depth for the ground-working tools 652 can be identified, based on soil conditions and desired use of the tool (e.g., planting seeds at a desired depth), and input to the system using the user interface 602. In this implementation, the controller 604 can send signals to the actuator 402 (e.g., using the actuation system 606) to dispose the spring assembly 308 at a desired location on the lever arm 310 that is pre-determined to provide the desired amount of downforce applied to the implement's ground-working tools 652. As the implement is towed over the field, the ground conditions may change, resulting in the ground-working tools 652 to alter their in-ground depth. In this example, the controller may identify the change in soil conditions based on the load sensor data from the load sensor 612, and provide appropriate adjustments to the downward force by adjusting a position of the spring assembly 308 on the lever arm 310. Alternately, the user may adjust the downward force by inputting instructions in the user interface 602 that results in the controller 604 adjusting the position of the spring assembly 308 on the lever arm 310.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A system for application of a variable downward force for a ground-working implement, comprising:
   a movable frame operably engaged with a stationary frame by a linkage, the movable frame supporting the ground-working implement to engage the ground;
   a downforce application device frame operably, fixedly engaged with the stationary frame;
   a lever arm pivotably engaged with a bottom portion of the downforce application device frame;
   a spring assembly pivotably engaged with the downforce application device frame at a first end and movable along the lever arm at a second end, the spring assembly applying a downward biasing force to the lever arm; and
   a coupling arm engaged with the lever arm at a first end of the coupling arm and engaged with the linkage at a second end of the coupling arm;
   wherein disposing the spring assembly at a first end of the lever arm applies a downward force to the linkage, and disposing the spring assembly at a second end of the lever arm applies an upward force to the linkage.

2. The system of claim 1, the spring assembly comprising one of:
   a mechanical spring;
   a pneumatic spring; and
   a hydraulic spring or accumulator.

3. The system of claim 1, the spring assembly providing a substantially constant downward biasing force.

4. The system of claim 1, the spring assembly providing a selectably variable downward biasing force.

5. The system of claim 1, the lever arm comprising a pivot point that is disposed closer to the second end than the first end.

6. The system of claim 1, the lever arm comprising a concave shape along a side facing the spring assembly.

7. The system of claim 1, comprising an actuator coupled with the spring assembly to translate the bottom of the spring assembly along the lever arm.

8. The system of claim 7, the actuator comprising a drive gear driven by a motor that engages a driven gear disposed on the lever arm to move the spring assembly along the lever arm.

9. The system of claim 7, comprising a controller communicatively coupled with the actuator, the controller controlling the actuator to position the spring assembly along the lever arm.

10. The system of claim 9, an implement load sensor communicatively coupled with the controller to provide data to the controller, the data indicative of a load applied by the ground on the implement, and the controller using the actuator to control the position of the spring assembly along the lever arm based at least upon the data indicative of the load applied by the ground on the implement.

11. The system of claim 10, the controller communicatively coupled with a user interface that displays information to a user resulting from the data indicative of a load applied by the ground on the implement, and the controller performing one or more of:
    automatically adjusting the position of the spring assembly along the lever arm, using the actuator, based at least upon the data indicative of the load applied by the ground on the implement and a preset threshold load level; and
    adjusting the position of the spring assembly along the lever arm, using the actuator, based at least upon input received from the user interface.

12. A variable downward force application device for a ground-working implement having a stationary frame coupled by a linkage to a movable frame, the variable downward force application device comprising:
    a variable downward force application device frame fixedly engaged with the stationary frame of the ground-working implement, the device frame comprising a top member and a bottom member;
    a lever arm pivotably engaged with the bottom member of the device frame, the lever arm comprising a pivot point, a first end, and a second end, wherein the pivot point is disposed between the first end and the second end;
    a spring assembly comprising a top and bottom, the top pivotably engaged with the top member of the device frame, the bottom movable along the lever arm between the first end and the second end, the spring assembly applying a downward biasing force on the lever arm; and
    a coupling arm comprising a first end and second end, the first end pivotably engaged with the first end of the lever arm, and the second end pivotably engaged with the linkage of the ground-working implement;
    wherein disposing the spring assembly at the first end of the lever arm applies a downward force to the linkage, and disposing the spring assembly at the second end of the lever arm applies an upward force to the linkage.

13. The system of claim 12, the spring assembly comprising an actuator that adjusts the amount of downward biasing force applied by the spring assembly.

14. The device of claim 12, the pivot point disposed closer to the second end than the first end.

15. The device of claim 12, the spring assembly coupled with an actuator to operably, selectably move the bottom of the spring assembly along the lever arm.

16. The device of claim 15, the spring assembly actuator communicatively coupled with a controller that controls the actuator to position the spring assembly long the lever arm, the controller communicatively coupled with one or more of:
    an implement load sensor that provides data indicative of a load applied by the ground on the implement, and the controller using the actuator to dynamically control the position of the spring assembly along the lever arm based at least upon the data indicative of the load applied by the ground on the ground-working implement; and
    a user interface that displays information to a user resulting from the data indicative of a load applied by the ground on the ground-working implement, and receives input from the user to adjust the position of the spring assembly along the lever arm, using the actuator, based at least upon input received from the user interface.

17. The device of claim 12, comprising a gear assembly operably coupled with the spring assembly and the lever arm, the gear assembly comprising a driver gear actuated by a selectably controllable motor, and a driven gear that moves the bottom of the spring assembly along the lever arm.

18. The device of claim 12, the lever arm shaped to apply a greater amount of downward force to the linkage as the spring assembly is translated from the pivot point to the first end, and to apply a greater amount of upward force to the linkage as the spring assembly is translated between the pivot point and the second end.

19. A system for application of a variable downward force for a ground-working implement, comprising:
    a movable frame operably engaged with a stationary frame by a four-bar linkage, the movable frame supporting the ground-working implement to engage the ground;
    a downforce application device frame operably fixed engaged with the stationary frame, the downforce application device frame comprising a top member and a bottom member;
    a lever arm pivotably engaged with the bottom member of the downforce application device frame, the lever arm comprising a pivot point, a first end, and a second end, wherein the pivot point is disposed between the first end and the second end
    a spring assembly pivotably engaged with the top member of the device frame at a first end and movable along the lever arm at a second end between the first end and second end of the lever arm, the spring assembly applying a downward biasing force to the lever arm;
    an actuator coupled with the spring assembly to translate the bottom of the spring assembly along the lever arm between the first end and the second end;
    a controller communicatively coupled with the actuator, the controller controlling the actuator to position the spring assembly along the lever arm; and
    a coupling arm coupling arm pivotably engaged with the first end of the lever arm, and pivotably engaged with the four-bar linkage at an opposite end;
    wherein disposing the spring assembly at the first end of the lever arm applies a downward force to the four-bar linkage, and disposing the spring assembly at the second end of the lever arm applies an upward force to the four-bar linkage.

20. The system of claim 19, the actuator communicatively coupled with a controller that controls the actuator to position the spring assembly long the lever arm, the controller communicatively coupled with one or more of:
    an implement load sensor that provides data indicative of a load applied by the ground on the ground-working implement, and the controller using the actuator to dynamically control the position of the spring assembly along the lever arm based at least upon the data indicative of the load applied by the ground on the ground-working implement; and a user interface that displays information to a user resulting from the data indicative of a load applied by the ground on the ground-working implement, and receives input from the user to adjust the position of the spring assembly along the lever arm, using the actuator, based at least upon input received from the user interface.

\* \* \* \* \*